United States Patent
Huber et al.

(10) Patent No.: US 11,660,675 B2
(45) Date of Patent: May 30, 2023

(54) COVER ARRANGEMENTS FOR MACHINES FOR MANUFACTURING THREE-DIMENSIONAL COMPONENTS

(71) Applicant: TRUMPF Laser—und Systemtechnik GmbH, Ditzingen (DE)

(72) Inventors: Uwe Huber, Ingersheim (DE); Markus Pieger, Wendlingen am Neckar (DE); Björn Ullmann, Tamm (DE)

(73) Assignee: TRUMPF Laser-und Systemtechnik GmbH, Ditzingen (DE)

( * ) Notice: Subject to any disclaimer, the term of this patent is extended or adjusted under 35 U.S.C. 154(b) by 18 days.

(21) Appl. No.: 16/862,920

(22) Filed: Apr. 30, 2020

(65) Prior Publication Data
US 2020/0254526 A1 Aug. 13, 2020

Related U.S. Application Data

(63) Continuation of application No. PCT/EP2018/077926, filed on Oct. 12, 2018.

(30) Foreign Application Priority Data

Nov. 3, 2017 (DE) .......................... 102017125748.9

(51) Int. Cl.
*B22F 12/00* (2021.01)
*B33Y 30/00* (2015.01)
(Continued)

(52) U.S. Cl.
CPC .............. *B22F 12/38* (2021.01); *B22F 10/28* (2021.01); *B22F 12/30* (2021.01); *B33Y 30/00* (2014.12);
(Continued)

(58) Field of Classification Search
CPC .......... B22F 12/00; B22F 10/00; B22F 12/38; B33Y 30/00; B29C 64/205; B29C 64/25; B29C 64/255; B29C 64/264
See application file for complete search history.

(56) References Cited

U.S. PATENT DOCUMENTS

2010/0031882 A1* 2/2010 Abe .......................... B05C 5/02
118/620
2019/0099949 A1* 4/2019 Stammberger ........ B29C 64/321

FOREIGN PATENT DOCUMENTS

DE 19853947 C1 2/2000
DE 102012012344 A1 9/2013
(Continued)

OTHER PUBLICATIONS

Bechmann et al., EPO Machine Translation of DE 102015005780 A1 (Year: 2016).*
(Continued)

*Primary Examiner* — Seyed Masoud Malekzadeh
(74) *Attorney, Agent, or Firm* — Fish & Richardson P.C.

(57) ABSTRACT

Cover assemblies for machines are disclosed, as well as machines and methods for producing three-dimensional components by selectively solidifying a material by a beam acting on the material, including a build cylinder cover that sealingly closes an opening of the build cylinder for changing of the build cylinder, and including a process chamber cover associated with the build cylinder cover, which are detachably connected to one another via an interface, wherein the build cylinder cover and the process chamber cover are formed as a single handling unit for changing the build cylinder.

17 Claims, 8 Drawing Sheets

(51) Int. Cl.
   *B22F 12/30* (2021.01)
   *B22F 12/49* (2021.01)
   *B22F 12/80* (2021.01)
   *B22F 10/28* (2021.01)

(52) U.S. Cl.
   CPC .............. *B22F 12/22* (2021.01); *B22F 12/49* (2021.01); *B22F 12/80* (2021.01)

(56) References Cited

FOREIGN PATENT DOCUMENTS

| DE | 102015005780 A1 | * | 12/2016 | ........... B29C 64/371 |
| DE | 102015005780 A1 | | 12/2016 | |
| DE | 102015211538 A1 | | 12/2016 | |
| EP | 1514622 A1 | | 3/2005 | |
| EP | 1704989 A2 | | 9/2006 | |
| EP | 3231538 A1 | | 10/2017 | |
| WO | WO-2018202305 A1 | * | 11/2018 | .............. B22F 10/20 |
| WO | WO 2019/086231 A1 | | 5/2019 | |

OTHER PUBLICATIONS

PCT International Preliminary Report on Patentability in International Appln. No. PCT/EP2018/077926, dated May 5, 2020, 10 pages.
PCT International Search Report and Written Opinion in International Appln. No. PCT/EP2018/077926, dated Mar. 14, 2019, 25 pages (with English translation).
EP Office Action in European Appln. No. 18785958.2, dated Feb. 1, 2023, 12 pages (with English translation).

* cited by examiner

COVER ARRANGEMENTS FOR MACHINES FOR MANUFACTURING THREE-DIMENSIONAL COMPONENTS

CROSS REFERENCE TO RELATED APPLICATIONS

This application is a continuation of and claims priority under 35 U.S.C. § 120 from PCT Application No. PCT/EP2018/077926, filed on Oct. 12, 2018, which claims priority from German Application No. 10 2017 125 748.9, filed on Nov. 3, 2017. The entire contents of each of these priority applications are incorporated herein by reference.

TECHNICAL FIELD

The disclosure relates to a cover arrangement for machines for manufacturing three-dimensional components by selective solidification of a powdery building material applied in layers by means of a beam acting on the building material and methods for exchanging a construction cylinder in such machines.

BACKGROUND

A device for manufacturing three-dimensional objects by successive solidification of layers of a radiation-solidifiable building material at the points corresponding to the respective cross-section of the object is known from DE 10 2015 005 780 A1. This device comprises a process chamber, which is enclosed by a housing. The process chamber is provided with a construction holder and an application device for applying layers of the building material to a support device in the construction holder. The construction holder is assigned or attached to an opening in the process chamber floor. This construction holder can be removed as a separate interchangeable holder or within an interchangeable module of the device. For this purpose, the construction holder is provided with an inert gas-tight cover device. The cover device is designed as a sliding cover, which is provided below the process chamber floor. The opening of the construction container is closed by a sliding movement. Alternatively, the cover device can be designed as a roller cover, which corresponds to the sliding cover in its function. The sliding cover to close the construction holder and a roller cover arranged below the process chamber floor to close the opening in the process chamber floor can also be provided.

A machine for manufacturing three-dimensional components by selective solidification of a layered, e.g., powdery, building material is known from EP 2 732 889 A2. This machine includes a machine frame and a beam source, such as a laser source, for example, arranged on the machine frame. This beam source emits a beam which is deflected or guided by a beam deflection device onto a working plane of a working surface in a process chamber. Below the working plane, a first and second construction cylinder are provided. Each construction cylinder includes a substrate plane which can be moved up and down therein to create the three-dimensional component. A storage chamber is provided adjacent to the construction cylinder, through which powdery construction material is provided. A collecting chamber is provided opposite the construction cylinder. By means of an application and levelling device, powdery building material is fed to the construction cylinder(s). The unneeded building material is transferred into the collecting chamber by means of the application and levelling device.

The three-dimensional component can be manufactured by laser melting or laser sintering. When exchanging a construction cylinder, a cover is positioned on the opening of the construction cylinder in order to avoid a contamination of the surroundings with the non-solidified building material and an interaction with atmospheric oxygen.

A machine for manufacturing three-dimensional components by selective solidification of a layered, e.g., powdery, building material by means of a beam acting on the building material is known from DE 20 2013 009 787 U1. After the component has been manufactured, the construction cylinder is closed inside the process chamber with a cover. The cover is moved from a position at the side of the construction cylinder to the top of the construction cylinder by a cover positioning device and the construction cylinder is closed. Subsequently, the construction cylinder, which is sealed against the ambient atmosphere, is moved out of the process chamber into an exchanging station.

When the entire construction cylinder with the cover positioned on it is moved out of the process chamber, the process gas escapes from the process chamber. In addition, contamination of the building material in the surrounding area can result. Due to such an exchange of the construction cylinder, the design of the machine with several construction cylinders arranged adjacent to each other is disadvantageous.

SUMMARY

The disclosure provides cover arrangements for machines for manufacturing three-dimensional components that enable a simple and quick exchange of a construction cylinder in a process chamber of the machine. Furthermore, the disclosure features machines for manufacturing three-dimensional components in a manner that protects both the loose construction material in the construction cylinder and the process chamber from interactions with atmospheric oxygen during a construction cylinder exchange. The disclosure also provides methods for exchanging a construction cylinder in a machine for producing three-dimensional components, which can be carried out easily and safely.

The new cover arrangements include a construction cylinder cover and a process chamber cover that are detachably connected to each other by an interface. The process chamber cover and the construction cylinder cover are designed as a manageable unit, e.g., a single handling unit, for exchanging the construction cylinder. This cover arrangement enables both a closure of an opening of the construction cylinder in a process chamber and a closure of an opening in a working surface of the process chamber to be enabled when the construction cylinder is exchanged in a process chamber. Due to the design as a single handling unit, the cover arrangement can be positioned together with the process chamber cover and the construction cylinder cover for the opening of the process chamber, such that subsequently, when exchanging the construction cylinder, both the opening of the construction cylinder and the opening of the process chamber can be closed. This prevents interaction with atmospheric oxygen and thus counteracts oxidation of the building material. At the same time, the surroundings are protected from the escape of the unsolidified and also hot building material when the construction cylinder is exchanged.

In some embodiments, a positive interface is provided between the process chamber cover and the construction cylinder cover and this positive interface can be formed by at least one connecting element that aligns the process chamber cover to the construction chamber cover, e.g., centrally. As a result, the process chamber cover and the construction cylinder lid are aligned in a defined position relative to one another, such that an exact positioning of the cover arrangement for opening the process chamber is made possible and both the process chamber lid and the construction cylinder lid are aligned.

Advantageously, the process chamber cover lies loosely on the construction cylinder cover. This arrangement represents a constructively simple design and yet allows the opening of the construction cylinder and subsequently the opening of the process chamber cover to be closed when the construction cylinder is removed from the process chamber.

The construction cylinder cover can have a conical peripheral surface, which ends with a radially protruding annular collar. Above the annular collar, the receptacle, e.g., the peripheral groove, is preferably provided for the arrangement of the construction cylinder cover with the process chamber cover resting on it in the carrier. The conical peripheral surface has the advantage that the single handling unit consisting of the construction cylinder cover and the process chamber cover can be easily centered for opening the construction cylinder. It can also act as a sealing surface. For example, the annular collar rests on the upper opening edge of the construction cylinder in a sealing manner. The annular collar and the peripheral surface can also form a seal together.

In addition, in some embodiment, the process chamber cover of the cover arrangement has a peripheral sealing surface, which is connected to a shoulder. This results in a simple construction of the process chamber cover which, after positioning in an opening of the working surface of the process chamber, lies independently in a closed position. Through the peripheral sealing surface, e.g., a cylindrical sealing surface, a seal assigned or attached to the opening of the process chamber can abut the process chamber cover and seal the process chamber, such that during the exchange of a construction cylinder in at least one further adjacent construction cylinder, the manufacturing of a three-dimensional component is made possible. This prevents process gas from escaping from the process chamber.

In additional embodiments, the process chamber cover and the construction cylinder cover are accommodated by and transported in a moveable carrier. This allows an easy traversing movement of the cover arrangement on the working surface of the process chamber to position the cover arrangement for opening the process chamber.

In some embodiments, the moveable carrier has a chassis by which the cover arrangement can be moved or transported on the working surface of the process chamber.

Such a moveable carrier can be moved within the process chamber with an application and levelling device. A connection point can be provided on the carrier, which can be coupled to the application and levelling device. For example, this coupling point can be designed as a so-called zero-point clamping system, whereby a defined connection of the carrier to the application and levelling device takes place, such that an exact positioning of the carrier for opening the process chamber is made possible.

Furthermore, in some embodiments the support can have a base plate that includes an open-edge, U-shaped recess, and the construction cylinder cover can have a receptacle, e.g., a peripheral groove, by which the construction cylinder is detachably received on the base plate. A lateral displacement movement of the carrier towards the construction cylinder cover provides a simple decoupling of the construction cover together with the process chamber cover from the carrier as soon as the opening of the construction cylinder engages with the construction cylinder cover.

The cover arrangement can be manipulated by a gripping device to the carrier according to an alternative embodiment. This gripping device includes at least two, e.g., three grippers, which engage in the peripheral groove on the construction cylinder cover in order to handle the construction cylinder cover and the process chamber cover together.

The grippers of the gripping device can be controlled by a common drive. By way of example, a belt drive can be provided to control the grippers, which are spatially separated from each other. Advantageously, two grippers arranged opposite each other are provided, or, for example, three grippers positioned in an isosceles triangle. For example, a swivel movement of a gripping element of the respective gripper is controlled by the common drive to transfer the gripping elements into an engagement position in the peripheral groove. Alternatively, a further engagement movement of the respective gripping element of the gripper can be provided to engage in the peripheral groove on the construction cylinder cover.

Furthermore, in some embodiments the gripper device can be moved in the process chamber parallel to the working plane and/or at the height of the working plane. This means that the cover arrangement can be transferred to the respective stowage position or working position for exchanging a construction cylinder.

In another aspect, the disclosure provides machines for manufacturing three-dimensional components by selective solidification of the building material, which is applied in layers and is e.g., powdery, by a beam acting on the building material, in which a cover arrangement according to one of the preceding embodiments is provided for exchanging the construction cylinder to the process chamber, wherein the cover arrangement is arranged in the process chamber. In this way, the process environment can be protected during the exchange of the construction cylinder so that possibly still hot, unconsolidated building material and process gases do not escape and/or interact with atmospheric oxygen.

In some embodiments, the cover arrangement is positioned in the process chamber with the application and levelling device for opening the process chamber. This means that no additional handling equipment or exchanging stations are required. Instead, the movement components already present in the machine, e.g., that move along linear axes, are used for positioning the cover arrangement.

In other embodiments, the cover arrangement includes a construction cylinder cover for closing an opening of the construction cylinder and a process chamber lid for closing the opening in the working surface of the process chamber. Thus, in a machine having a plurality of construction cylinders assigned or attached to the process chamber, the manufacture of a three-dimensional part can be carried out during the exchange from one construction cylinder to an adjacent construction cylinder. This enables a reduction of cycle times and an increase in productivity.

In some embodiments, a lifting seal is arranged below the working surface and the opening of the process chamber, which can preferably be pressurized and engages in a sealing manner with the construction cylinder or the process chamber cover. In this way, a secure seal can be provided both during a working process for manufacturing a three-dimensional component and during an exchanging process of the construction cylinder.

In another embodiment, a parking position for the cover arrangement is provided in the process chamber. This parking position can be aligned with a common longitudinal central axis of at least two openings in the process chamber. This means that a simple movement along a linear axis is sufficient to move the cover arrangement to one of the openings in the process chamber as required for exchanging the construction cylinder.

In another aspect, the disclosure features methods for exchanging a construction cylinder in machines for producing a three-dimensional component by selective solidification of a layered, e.g., powdery, building material by a beam acting on the building material, in which a cover arrangement is positioned in a working position for opening a process chamber in accordance with one of the aforementioned embodiments, to which the construction cylinder to be exchanged is assigned or attached and in which the construction cylinder is lifted in the direction of the process chamber and the opening of the construction cylinder is closed by the construction cylinder cover and the construction cylinder is lowered in the opposite direction to the process chamber after being closed by the construction cylinder cover and the opening of the process chamber is closed by the process chamber cover. By this cover arrangement, a lifting movement of the construction cylinder along a lifting axis is sufficient to successively close the opening of the construction cylinder and the opening of the process chamber. This lifting axis for carrying out the lifting movement is already present in the machine, such that no additional moveable axes are required.

In some embodiments, the process chamber cover detaches itself independently from the construction chamber cover during the lifting movement of the construction cylinder out of the process chamber. For this purpose, a positive-locking interface with at least one connecting element is preferably provided. This positive-locking interface receives the process chamber cover due to its gravity on the construction cylinder cover, e.g., centrally aligned.

In certain embodiments, before positioning the cover arrangement for opening the process chamber of the construction cylinder to be exchanged, the substrate plate with the component is inserted into the construction cylinder to be exchanged. In this way, the component is positioned within the construction cylinder. A subsequent positioning of the cover assembly by a traversing movement over the opening of the process chamber can be carried out unhindered.

In some embodiments, during the lifting movement of the construction cylinder onto the cover arrangement positioned for opening the process chamber or after the lifting movement, an annular suction device is activated which at least partially surrounds the opening of the process chamber. In this way, the building material present in the edge region of the opening of the process chamber can be removed. This annular suction device preferably has fluid nozzles which are alternately or simultaneously pressurized and vacuumed to remove the building material that is thus released.

In additional embodiments, after lifting the construction cylinder into the process chamber and closing the construction cylinder by means of the construction cylinder cover, the position of the construction cylinder is held and the carrier of the cover arrangement is moved out of its working position until the construction cylinder cover and the process chamber cover resting on it are released from the carrier. Thus, for positioning the cover arrangement, one traversing movement along one axis is sufficient for exchanging the construction cylinder and a further traversing movement in another axis is sufficient for closing the construction cylinder and the process chamber. This means that only traversing movements in two axes, which are e.g., aligned perpendicularly to each other, are required, which the previous machines already have.

After closing the construction cylinder with the construction cylinder cover, the construction cylinder can be brought out of the process chamber by means of a lifting movement, e.g., a lowering movement, and moved underneath the working surface. During this lifting movement, e.g., downward movement, the opening of the process chamber is closed by the process chamber cover. This allows the opening of the process chamber to also be closed simultaneously during a traversing movement to replace the construction cylinder.

In some embodiments, after the lifting movement of the construction cylinder out of the process chamber, a lifting seal that is in contact with the construction cylinder is opened until the process chamber cover closes the opening of the process chamber, and subsequently the lifting seal is reactivated such that it is in contact with the process chamber cover and seals the opening of the process chamber.

When exchanging the construction cylinder, it can be provided that, at least during the lifting movement of the construction cylinder out of the process chamber, the process chamber is subjected to an overpressure, e.g., of between 20 mbar and 50 mbar. This prevents atmospheric oxygen from entering the process chamber to prevent undesired oxidation, e.g., hot metal vapor deposits, on the process chamber walls of materials such as aluminum and titanium. The process chamber is can be supplied with an inert gas.

In an exchanging position of the construction cylinder, in which the construction cylinder is lowered and separated from the process chamber cover, the closed construction cylinder provided with a component is removed from the machine and a new construction cylinder closed with a construction cover is brought to the exchanging position to carry out a subsequent working process. This enables the construction cylinder cover to receive the process chamber cover when the construction cylinder moves to a working position in which the construction cylinder adjoins the opening of the process chamber, and subsequently the construction cylinder cover and the process chamber cover resting on it can in turn be received by the carrier. By means of a traversing movement of the carrier on the working surface, the U-shaped recess of the base plate of the carrier engages in the groove on the construction cylinder cover. The carrier with the covers accommodated in it can then be moved to a stowage position within the process chamber and subsequently a build process can be carried out in the newly exchanged construction cylinder.

DESCRIPTION OF DRAWINGS

The invention and other advantageous embodiments and developments of the same are described and explained in more detail in the following using the examples depicted in the drawings. The features to be taken from the description and drawings can be applied individually or in any combination according to the invention.

DETAILED DESCRIPTION

Figure 1:
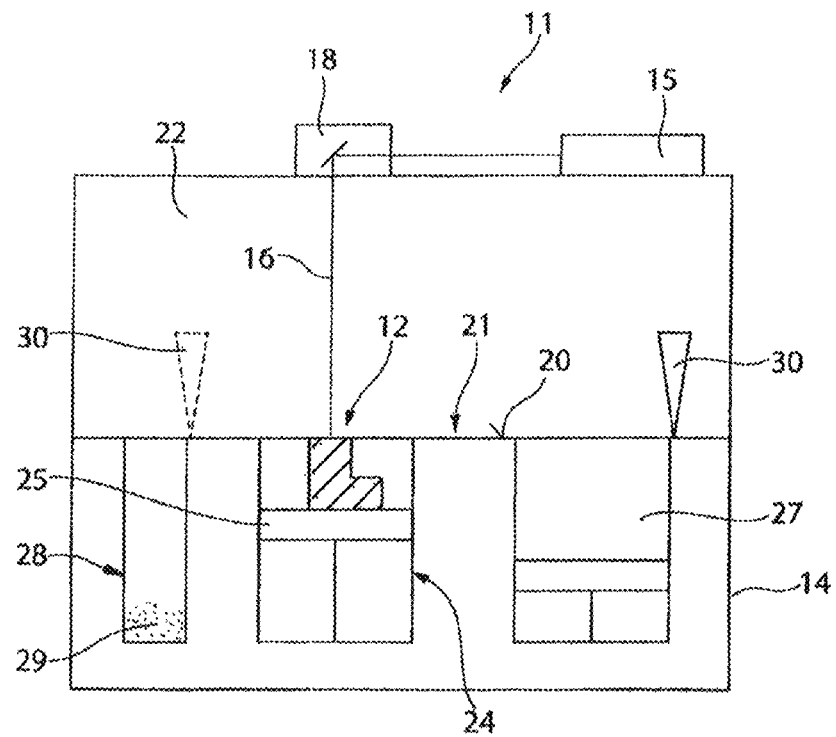
FIG. 1 is a schematic view of a machine for manufacturing three-dimensional components.

FIG. 1 shows a schematic view of a machine 11 for manufacturing a three-dimensional component 12 by successively solidifying layers of a powdery building material 29. This machine 11 includes a machine frame 14 and a beam source 15 arranged on the machine frame 14, for example, in the form of a laser source. This beam source 15 emits a beam 16, which is deflected and guided via a beam deflection device 18 onto a working plane 20 of a working surface 21 in a process chamber 22. The beam deflection device 18 can be designed in the form of one or more controllable mirrors, e.g., in the form of a scanner. Below the working plane 20, a construction cylinder 24 having a substrate plate 25 is provided, which can be moved within the construction cylinder 24 in order to structurally create the three-dimensional component 12 on it. A storage chamber 27 is provided adjacent to the construction cylinder 24, through which powdery building material 29 is provided. A collecting chamber 28 is provided opposite the construction cylinder 24. An application and levelling device supplies powdery building material 29 to the construction cylinder 24 from a starting position on the right depicted in FIG. 1. Unneeded building material 29 is transferred into the collecting chamber 28 (left end position) by means of the application and levelling device 30, such that it can in turn be processed and used again.

The building material 29 preferably consists of a metal or ceramic powder. Other material suitable and used for laser melting and laser sintering can also be used. The process chamber 22 is can be hermetically sealed. It is filled with protective gas or an inert gas for manufacturing the three-dimensional component 12, in order to avoid oxidation when melting the building material 29.

Figure 2:
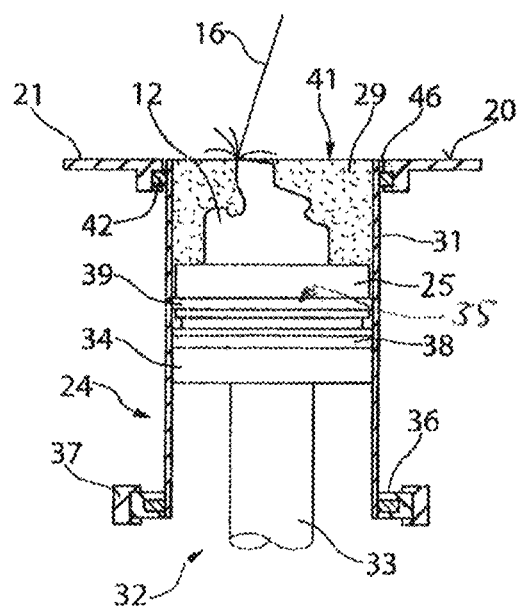
FIG. 2 is a schematic detailed view of a construction cylinder during a working process for manufacturing a three-dimensional component.

FIG. 2 shows an enlarged and more detailed view of the construction cylinder 24. The construction cylinder 24 includes a cylindrical wall 31, within which the substrate plate 25 can be moved up and down by a lifting device 32, wherein from this lifting device 32, only a piston rod 33 and a piston 34 acting on the substrate plate 25 are depicted. The substrate plate 25 and the piston 34 are detachably connected to each other by a clamping system 35. The construction cylinder 24 is interchangeably supported by a bracket 36. The construction cylinder 24 is aligned and fixed to the bracket 36 by an indexation 37. This indexation 37 is detachable for exchanging the construction cylinder 24.

A gas seal 38 and a powder seal 39 can be provided between the substrate plate 25 and the piston 34 to seal the construction cylinder 24 at the bottom. An opening 41 of the construction cylinder 24 is connected to the working surface 21 of the process chamber 22, e.g., flush with it, in a working position for manufacturing component 12. A lifting seal 42 engages with the outer periphery of the opening 41 below the working plane 20. By means of this lifting seal 42, an opening 46 in the process chamber 22 to the construction cylinder 24, e.g., to the wall 31 of the construction cylinder 24, is sealed in a gastight and powder-tight manner. This lifting seal 42 is activated in a sealing arrangement. By way of example, it is pressurized by means of a medium. In a deactivated state, this lifting seal 42 has a larger inner periphery. This allows the construction cylinder 24 to be moved downwards.

To increase the productivity of such a machine 11, the component 12 is not removed individually from the machine 11. Instead, the construction cylinder 24 with the component 12 provided within, and the unsolidified building material 29 surrounding the component 12, is removed from the machine 11, to insert an empty construction cylinder 24 into the machine 11, such that after this exchanging process, manufacturing with a new component 12 can take place immediately in the newly replaced construction cylinder 24. A component 12 can also be manufactured in an adjacent construction cylinder 24 during the exchanging process.

Figure 3:
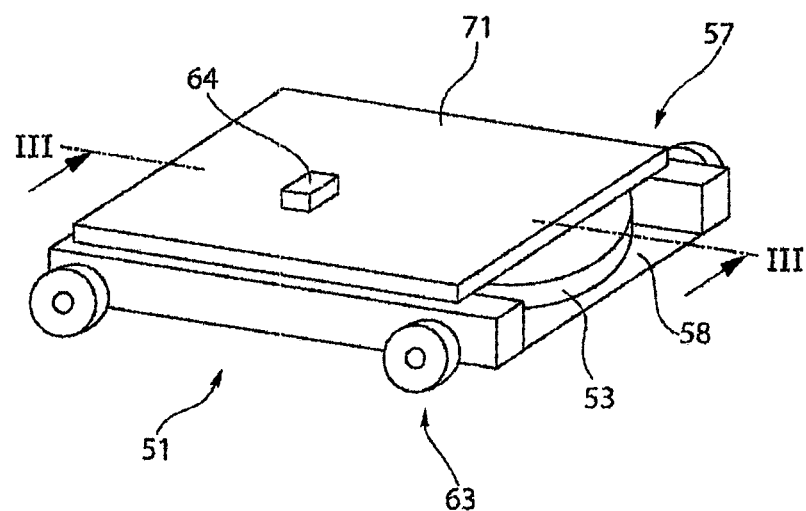
FIG. 3 is a perspective view of a cover arrangement as described herein.
Figure 4:
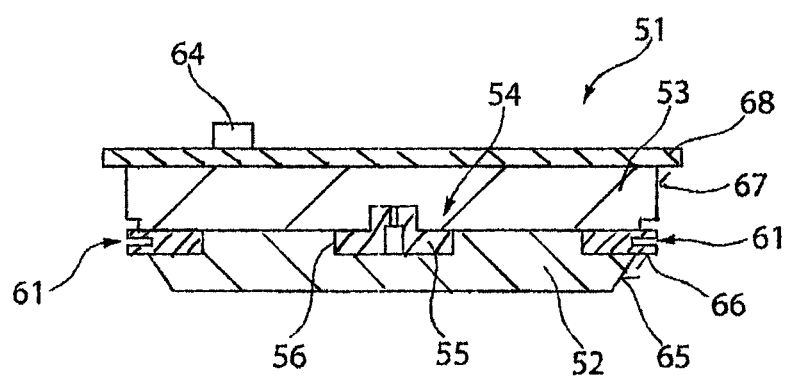
FIG. 4 is a schematic sectional view of the cover arrangement according to FIG. 3.
Figure 5:
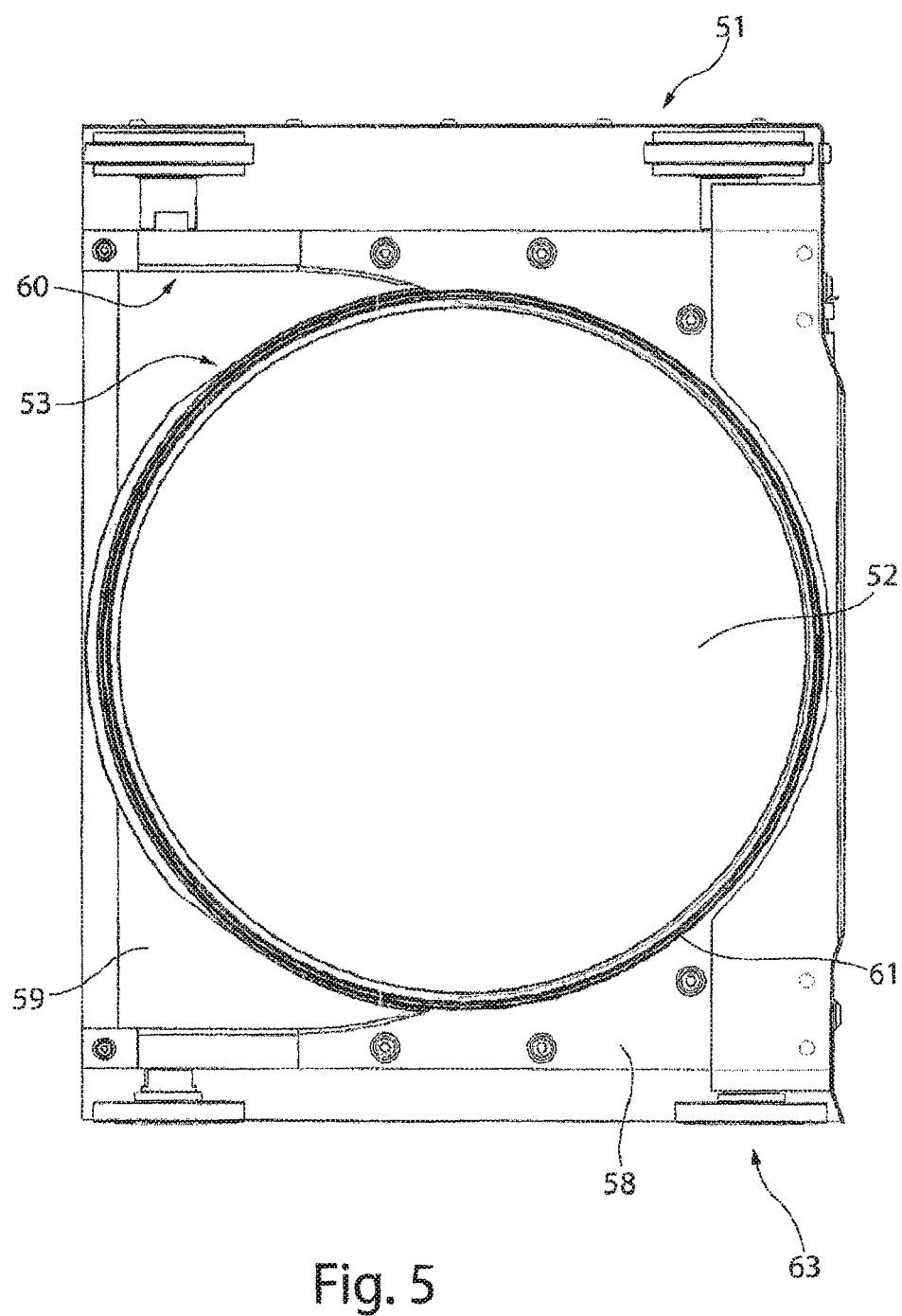
FIG. 5 is a schematic view of a carrier of the cover arrangement as according to FIG. 3.

For this exchanging of the construction cylinder 24 or removing the construction cylinder 24 containing the component 12 and the still hot building material 29, a cover arrangement 51 is provided, which is depicted in perspective in FIG. 3. A schematic sectional view along the line in FIG. 3 is depicted in FIG. 4, from which the construction of the cover arrangement 51 having a construction cylinder cover 52 and a process chamber cover 53 can be seen. In this sectional view, a carrier 57 of the cover arrangement 51 is not depicted. FIG. 5 depicts a schematic arrangement from above of a process chamber cover 53 having a construction cylinder cover 52, which are accommodated by the carrier 57.

The process chamber cover 53 rests on the construction cylinder cover 52. The process chamber cover 53 is connected to the construction cylinder cover 52 by a positive-locking interface 54. The positive-locking interface 54 can, for example, be formed by two complementary connecting elements 55, 56. This can be, for example, a conical projection 55 which engages in a recess 56. In some embodiments, the positive-locking interface 54 also allows the process chamber cover 53 to be aligned with the construction cylinder cover 52 with respect to their longitudinal center axes. For example, the two covers 52, 53 are aligned symmetrically to each other and lie in a common central axis.

The construction cylinder cover 52 and the process chamber cover 53 are provided together on a carrier 57. This carrier 57 includes a base plate 58 for accommodating them. This base plate 58 has a U-shaped recess 59, which is open at the edge. This U-shaped recess 59, which is open at the edge, serves for the detachable reception of the construction cylinder cover 52. This has a peripheral groove 61, which engages with the U-shaped recess 59 of the base plate 58. The U-shaped recess 59 has a filling region 60 which is wider than the peripheral U-shaped groove 61 to enable the cylinder cover 52 to be centered independently for being arranged in a correct position in the open-edge U-shaped recess 59.

The carrier 57 also has a chassis 63. The chassis 63 can, for example, include two axes, which are aligned parallel to each other, and accommodate rollers. The U-shaped recess 59, which is open at the edges, is aligned in the direction of travel of the carrier 57.

The construction cylinder cover 52 has a peripheral surface 65, e.g., cylindrical or conical peripheral surface 65, which is delimited by a radially outwardly projecting annular collar 66. The conical peripheral surface 65 is opposite the annular collar 66 and is assigned to the peripheral groove 61.

A connection point 64 can be provided on an outer side of the carrier 57 or on an outer side of a cover plate 71. This connection point 64 is used for coupling the cover assembly 51 to the application and levelling device 30, in order to control a movement of the cover assembly 51 from a parking position into a working position aligned with the opening 46 of the process chamber 22.

The process chamber cover 53 rests on the construction cylinder cover 52, said process chamber cover having a peripheral sealing surface 67 with the same radial extension as the peripheral groove 61 or protruding against it. The peripheral sealing surface 67 of the process chamber cover 53 is delimited by a shoulder 68, which forms a support surface when the process chamber cover 53 is positioned in the opening 46 of the working surface 21.

The carrier 57 also has the cover plate 71, which is positioned above the U-shaped, open-edge recess 59. The distance of the cover plate 71 from the base plate 58 corresponds to the distance or is slightly greater than the distance of the peripheral groove 61 on the construction cylinder cover 52 and an upper side of the process chamber cover 53.

In the following, the function of the cover arrangement 51 is explained in more detail according to FIGS. 3, 4, and 5 when the construction cylinder 24 is exchanged with the process chamber 22 using FIGS. 6 to 12.

Figure 6:
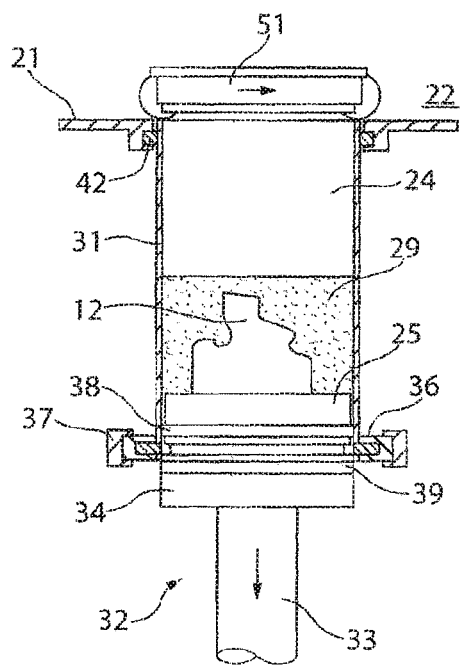
FIGS. 6 to 11 are schematic sectional views of successive working steps to close the construction cylinder and an opening of the process chamber for a subsequent exchange of the construction cylinder in the machine according to FIG. 1.

Starting from an arrangement of the substrate plate 25 in the construction cylinder 24 according to FIG. 2, the substrate plate 25 is first inserted into the construction cylinder 24 in preparation for exchanging the construction cylinder 24. Such a lowered position of the substrate plate 25 is depicted in FIG. 6. During or after the lowering movement of the substrate plate 25, the application and levelling device 30 is coupled to the cover arrangement 51. For this purpose, a schematically depicted connection point 64 can be provided. Subsequently, by means of a linear traverse movement of the application and levelling device 30, the cover arrangement 51 is positioned from a stowage position in the process chamber 22 to the opening 46 of the process chamber 22. This is depicted in FIG. 6.

The construction cylinder 24 is slightly lowered during the activated lifting seal 42. At the same time, an overpressure in the process chamber 22 can prevail. Additionally, an annular suction device 47, which surrounds the opening 46 and is depicted in more detail in FIG. 7, can be activated to fluidize any building material 29 still adhering in the edge region of the opening 46. This annular suction device 47 can be formed by several ducts, which merge below the lifting seal 42 into a radially circulating annular duct 48. The supplied medium is then blown radially according to arrow 49 across the edge of the opening of the construction cylinder 24 into its interior. The annular suction device 47 is subsequently deactivated.

Figure 8:
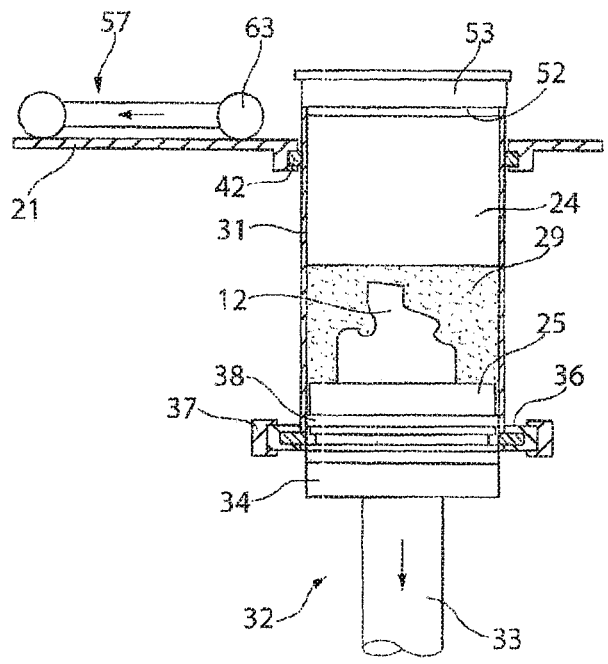
Figure 7:
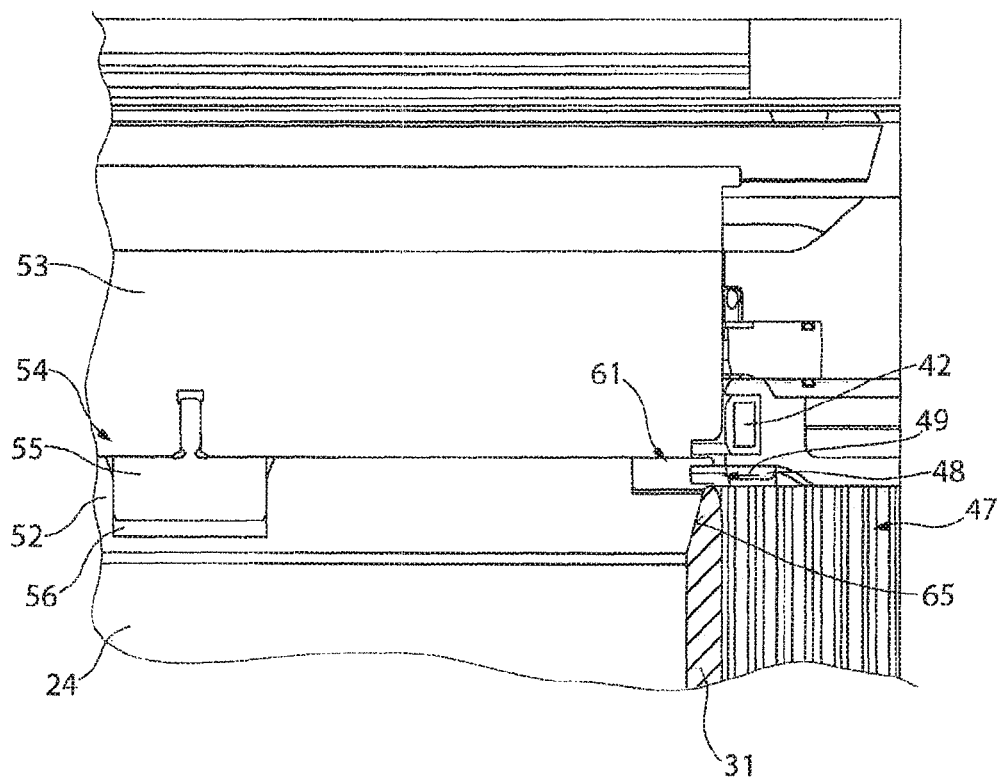

The construction cylinder 24 is lifted as shown in FIG. 8 by means of the lifting device 32 and moved into the process chamber 22. The opening 41 of the construction cylinder 24 accommodates the construction cylinder cover 52. The construction cylinder 24 fixes the construction cylinder cover 52 and the process chamber cover 53, while the carrier 57 is moved sideways such that the covers 52, 53 are released from the carrier 57 due to the U-shaped recess in the base plate 58.

Figure 9:
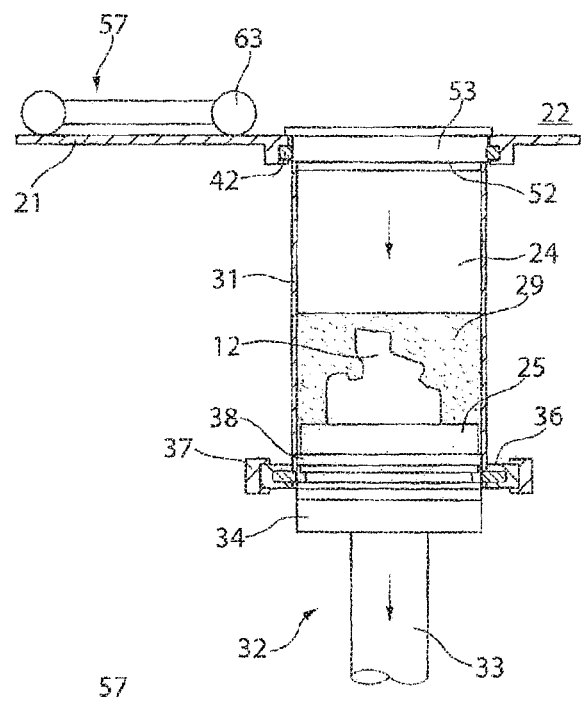
Figure 10:
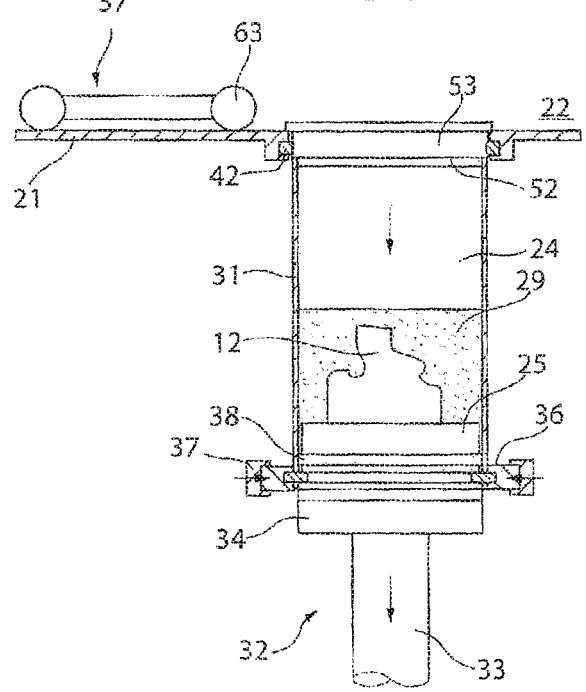

Subsequently, the construction cylinder 24 is lowered, e.g., simultaneously with the substrate plate 25, as depicted in FIG. 9. Before this, the lifting seal 42 is deactivated. In a first phase of the lifting movement out of the process chamber 22, the process chamber cover 53 closes the opening 46 of the process chamber 22. The lifting seal 42 is activated, whereby the opening 46 of the process chamber 22 is sealed. The assumption of this position, depicted in FIG. 10, can in turn be monitored by at least one sensing element. Subsequently, a further lifting movement of the construction cylinder 24 or the bracket 36 is controlled in order to detach the process chamber cover 53 from the construction cylinder cover 52 due to the positive-locking interface 54. Meanwhile, the carrier 57 can be moved to a stowage position within the process chamber 22.

Figure 11:
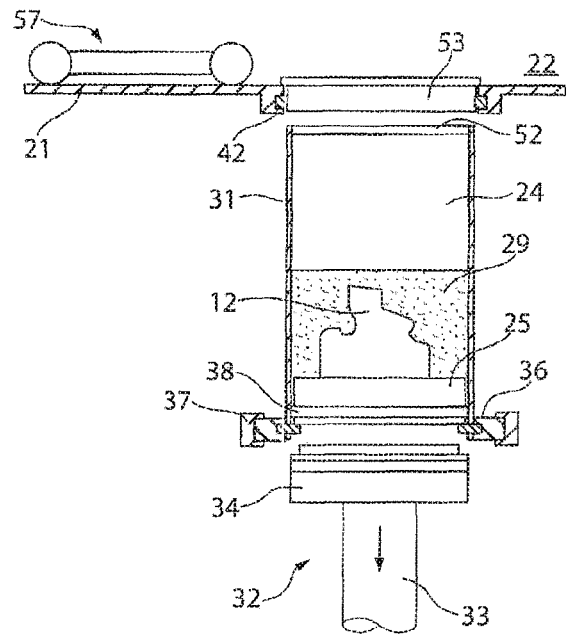

In a further exchange phase as shown in FIG. 11, the indexation 37 on the bracket 36 of the lifting device 32 is detached. The piston 34 of the lifting device 32 can then be lowered further such that the piston 34 detaches from the substrate plate 25. The bracket 36 is held in an exchange position, such that the construction cylinder 24 can be removed from the bracket 46 with a handling device. The construction cylinder 24 is thus closed. The hot component 12 and the heated building material 29 remain in the construction cylinder 24.

Figure 12:
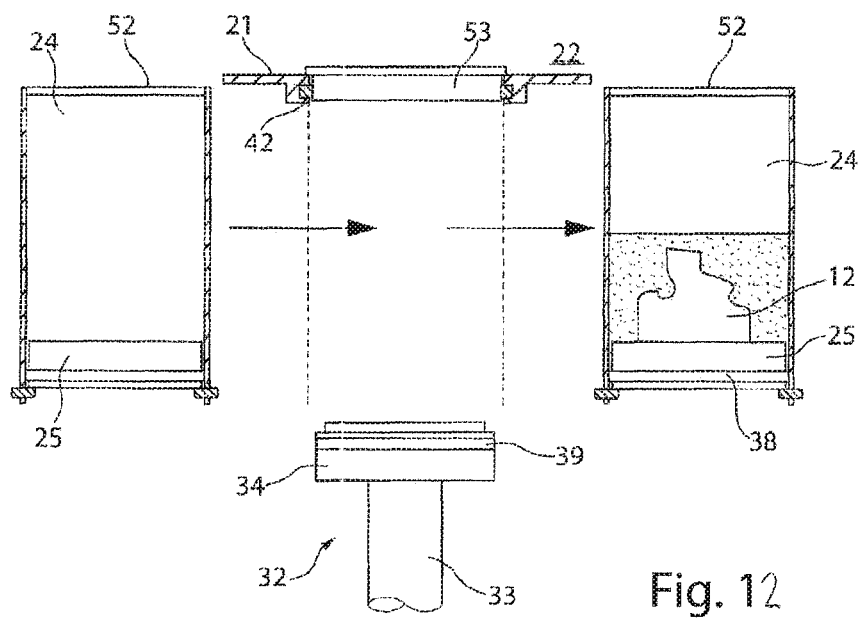
FIG. 12 is a schematic side view that depicts the exchanging of the construction cylinders.

This removal of the construction cylinder 24 from the machine 11 and a simultaneous supplying of an empty or new construction cylinder 24 are depicted in FIG. 12. After placing the empty construction cylinder 24 on the bracket 36, the steps described above are carried out in reverse order to prepare the construction cylinder 24 for a subsequent work process to manufacture a three-dimensional component 12.

Figures 13, 14:
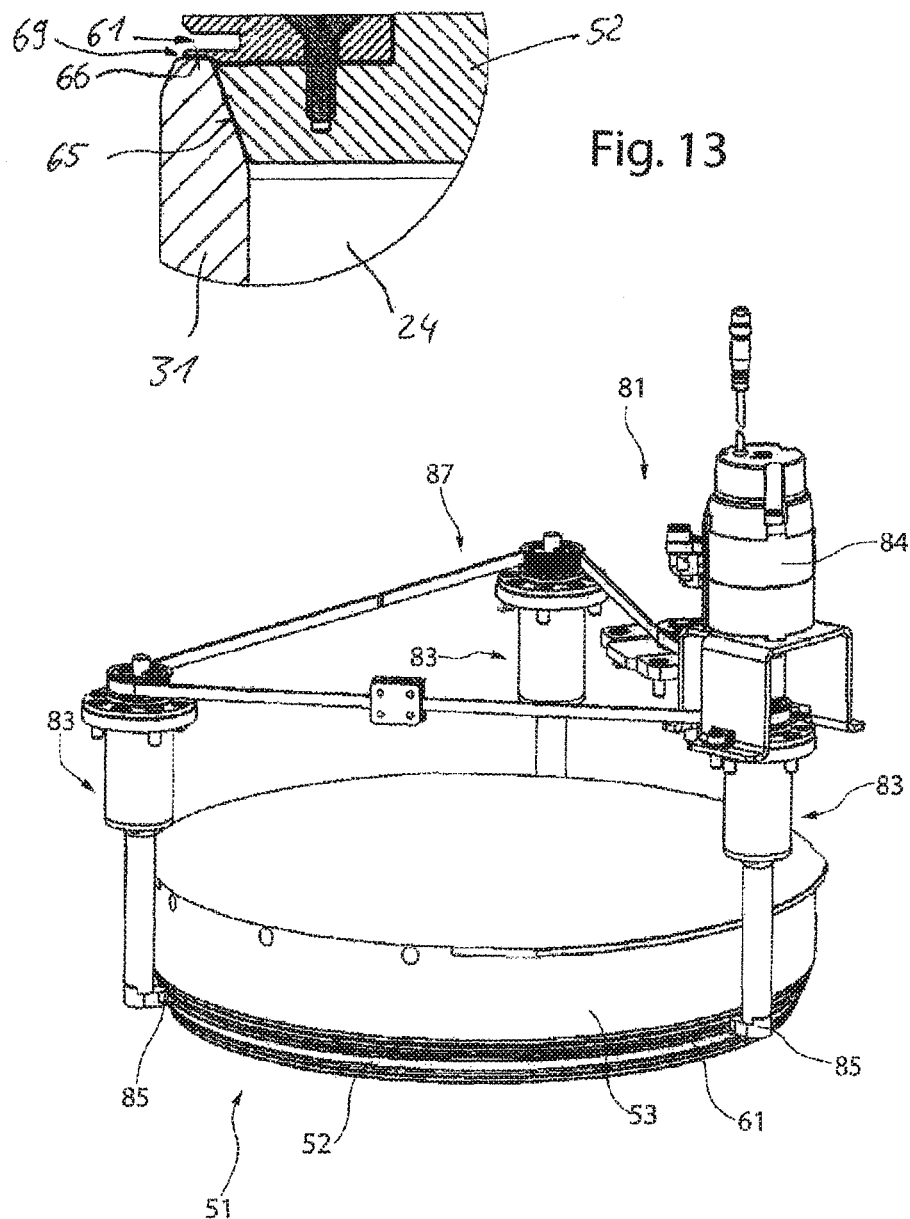
FIG. 13 is a schematically enlarged detailed view of a construction cylinder cover located on the construction cylinder.
FIG. 14 is a perspective view of an alternative embodiment for positioning the cover arrangement to open the process chamber.

FIG. 13 depicts a schematically enlarged detailed view of a construction cylinder cover 24 resting on the construction cylinder 24. The construction cylinder cover 52 can be provided in a self-centering manner on the upper opening edge of the wall 31 of the construction cylinder 24 by means of the peripheral surface 65, which is, for example, conically formed. The annular collar 66, which protrudes radially from the peripheral surface 65, can rest on one end face of the wall 31 of the construction cylinder 24 and form a seal. For example, a layer of sealing and heat-resistant material may be provided on the annular collar 66. The annular collar 66 forms an axial seal 69 or an edge seal with the end face of the wall 31 of the construction cylinder 24. In addition, the peripheral surface 65 can also be designed as a conical peripheral surface and also have a sealing effect.

FIG. 14 shows an alternative embodiment of the cover arrangement 51. In this embodiment, a gripping device 81 is provided instead of the moveable carrier 57. This gripping device 81 can be provided to be stationary in the process chamber 22. Alternatively, this gripping device 81 can be moved by means of the linear axis of the application and levelling device 30 within the process chamber 22. This gripping device 81 can include three grippers 83, which are provided for engaging in the peripheral groove 61 of the construction cylinder 52. The grippers 83 are can be aligned at the same distance from the cover arrangement 51, such that, for example, three grippers 83 ensure a secure reception of the cover arrangement 51. The grippers 83 are, for example, aligned in an isosceles triangle. A drive 87, for example a belt, cable, chain or toothed belt drive, which includes a motor 84, can be provided for driving the gripper elements 85 together. In this way, gripping elements 85 can be transferred simultaneously into a gripping position in which they engage in the peripheral groove 61 or, after positioning the construction cylinder cover 52 in the opening 41 of the construction cylinder 24, to be guided out of the peripheral groove 61.

The procedure and mode of operation for exchanging a construction cylinder 24 is analogous to the above-mentioned FIGS. 6 to 12. If this gripping device 81 is arranged above the process chamber 22, the gripping device 81 only moves vertically towards and then away from the construction cylinder 24. In a stowage position, the cover arrangement 51 is thus lifted from the working surface 21 in such a way that the application and levelling device 30 on the working surface 21 can be moved completely across the opening 22 of the working plane 20.

Other Embodiments

It is to be understood that while the invention has been described in conjunction with the detailed description thereof, the foregoing description is intended to illustrate and not limit the scope of the present disclosure, which is defined by the scope of the appended claims. Other aspects, advantages, and modifications are within the scope of the following claims.

What is claimed is:

1. A cover arrangement for a machine for manufacturing a three-dimensional component by selectively solidifying a powdery building material by a beam acting on the building material, the cover arrangement comprising
   a construction cylinder cover, which closes and seals an opening of a construction cylinder for exchanging the construction cylinder;
   a process chamber cover attached to the construction cylinder cover; and
   an interface, wherein the interface comprises at least one connecting element that centrally aligns and detachably connects the process chamber cover with the construction cylinder cover;
   wherein, when connected to each other, the construction cylinder cover and the process chamber cover together form a single unit when positioning for exchanging the construction cylinder, wherein the process chamber cover and the construction cylinder cover are transported in a moveable carrier, wherein the moveable carrier comprises a connection point, which is connectable to a gripper of an application and levelling device, and wherein the moveable carrier is positionable by the application and levelling device relative to the construction cylinder to be exchanged.

2. The cover arrangement of claim 1, wherein the process chamber cover and the construction cylinder cover are aligned centrally with each other, by at least two complementary connecting elements.

3. The cover arrangement of claim 1, wherein the process chamber cover lies on top of the construction cylinder cover.

4. The cover arrangement of claim 1, wherein the construction cylinder cover has a peripheral surface which is closed by a radially outwardly extending annular collar and a peripheral groove is provided above the annular collar.

5. The cover arrangement of claim 1, wherein the process chamber cover has a peripheral sealing surface, to which a shoulder connects.

6. The cover arrangement of claim 1, wherein the moveable carrier further comprises a chassis by which the construction cylinder cover and the process chamber cover are movable on a working surface of a process chamber.

7. The cover arrangement of claim 1, wherein the carrier further comprises a base plate with a U-shaped, open-edge recess, by which the construction cylinder cover with a peripheral groove on the base plate is detachably received in the U-shaped, open-edge recess and is movable out of the latter.

8. The cover arrangement of claim 1, wherein a gripper is arranged to engage both the process chamber cover and the construction cylinder cover.

9. The cover arrangement of claim 8, wherein the gripper comprises at least two grippers, each comprising at least one gripping element, which engage in a peripheral groove of the construction cylinder cover.

10. The cover arrangement of claim 9, wherein the at least two grippers are controllable by a common drive from a gripping position into a rest position.

11. The cover arrangement of claim 9, wherein the gripping elements of the at least two grippers are controllable by a rotary movement for engaging in a peripheral groove of the construction cylinder cover by a drive.

12. The cover arrangement of claim 8, wherein the gripper is movable in a process chamber parallel to a working plane, is changeable in height, or both.

13. A machine for manufacturing a three-dimensional component by selective solidification of a building material applied in layers by a beam acting on the building material, comprising
   at least one process chamber, which has at least one working surface aligned in an X-Y plane, to which at least one construction cylinder is exchangeably attached, in which a substrate plate is controlled in a moveable manner, and on which the three-dimensional component is produced;
   a beam source for generating the beam and at least one beam deflection device by which the beam is deflected onto the building material to be consolidated in the at least one construction cylinder;
   an application and levelling device comprising a gripper that is movable above the at least one working surface for applying the building material relative to the at least one construction cylinder; and
   a lifting device that moves the at least one construction cylinder at least in a working plane of the working surface to an opening of the at least one process chamber and comprises a piston, which moveably controls the substrate plate in the at least one construction cylinder,
   wherein a cover arrangement of claim 1 is provided in the at least one process chamber.

14. The machine of claim 13, wherein the cover arrangement in the at least one process chamber is movable with the application and levelling device to the opening of the at least one process chamber.

15. The machine of claim 13, wherein the cover arrangement comprises a construction cylinder lid for closing an opening of the construction cylinder and a process chamber cover for closing the opening in the at least one working surface of the at least one process chamber.

16. The machine of claim 13, wherein a lifting seal is provided below the at least one working surface and assigned to the at least one opening of the process chamber, wherein the lifting seal is pressurized and engages with a wall of the construction cylinder or the at least one process chamber cover in a sealing manner.

17. The machine of claim 13, wherein a connection point of the cover arrangement is provided in a common longitudinal central axis of at least two openings in the at least one process chamber for arranging construction cylinders.

\* \* \* \* \*